US005656964A

United States Patent [19]

Liu

[11] Patent Number: 5,656,964

[45] Date of Patent: Aug. 12, 1997

[54] CMOS LOW-VOLTAGE FOUR-QUADRANT MULTIPLIER

[75] Inventor: Shen-Iuan Liu, Keelung, Taiwan

[73] Assignee: National Science Council, Taipei, Taiwan

[21] Appl. No.: 507,529

[22] Filed: Jul. 26, 1995

[51] Int. Cl.$^{6}$ .......... G06F 7/44

[52] U.S. Cl. .......... 327/357; 327/356; 327/116; 327/119; 455/333

[58] Field of Search .......... 327/355, 356, 327/357, 116, 119; 364/841; 455/333

[56] References Cited

U.S. PATENT DOCUMENTS

| | | | |
|---|---|---|---|
| 3,838,262 | 9/1974 | Van De Plassche | 327/357 |
| 4,546,275 | 10/1985 | Pena-Finol et al. | 327/357 |
| 4,586,155 | 4/1986 | Gilbert | 327/357 |
| 5,397,931 | 3/1995 | Bayer | 327/534 |

*Primary Examiner*—Timothy P. Callahan
*Assistant Examiner*—Kenneth B. Wells
*Attorney, Agent, or Firm*—Spencer & Frank

[57] ABSTRACT

A four-quadrant multiplier, which is composed of CMOS transistors and suited to applications of low-voltage operation. It includes a first MOS transistor operated in the linear region; a second MOS transistor operated in the linear region and having the same transconductance value as that of the first MOS transistor; a first buffer means receiving the first input signal and maintaining a definite voltage difference between the first input signal and the drain of the first MOS transistor as well as a definite current difference between the negative terminal of the output port and the drain of the first MOS transistor; a second buffer means receiving the second input signal and maintaining the definite voltage difference between the second input signal and the connected terminal of the sources of the first MOS transistor and the second MOS transistor; a third buffer means receiving the first input signal and maintaining the definite voltage difference between the first input signal and the drain of the second MOS transistor as well as a definite current difference between the positive terminal of the four-quadrant multiplier and the drain of the second MOS transistor; a first load coupled between the negative terminal of the four-quadrant multiplier and the high voltage source; and the second load having a same load value as the first load and coupled between the positive terminal of the four-quadrant multiplier and the low voltage source.

13 Claims, 1 Drawing Sheet

CM OS LOW-VOLTAGE FOUR-QUADRANT MULTIPLIER

BACKGROUND OF THE INVENTION

1. Field of the Invention

The present invention is in general related to an integrated circuit. More specifically, the present invention is related to a four-quadrant multiplier, which is composed of CMOS transistors and suited to applications of low-voltage operation.

2. Description of the Prior Art

Owing to the rapid development of very large integrated circuits (VLSIs), concentration of transistors in a finite chip area continues to increase. Therefore, the voltage source powering integrated circuits has been reduced from 5 V to 3 V, and even to 1 V. Toward this trend, in a digital circuit, one way that reduces the feature size of components therein can be taken to reach this requirement. However, in an analog circuit, it may need to re-design the whole circuit again.

In bipolar transistor technology, Gilbert cells are usually used to build a four-quadrant multiplier. But in MOS transistor technology, four approaches have emerged. The first approach, similar to the case of bipolar technology, is to use Gilbert cells to build a four-quadrant multiplier. The second approach is to use the properties of MOS transistors operated in the saturation region to design multipliers. The saturation region is also called an active region where the drain current value is proportional to the square of the gate-drain voltage value. The third approach is to use the properties of MOS transistors operated in the linear region to design multipliers. The linear region is also called the triode region where the drain current value is linearly proportional to the gate-source voltage while the drain-source voltage is a constant. The fourth or last approach is to use the properties of MOS transistors operated in the subthreshold region to design multipliers, Multipliers are essential components that serve as building blocks for a large amount of applications, such as adaptive filters, frequency doublers, and modulators. The operation of a four-quadrant multiplier involves receiving a first input signal V1, a second input signal V2, a third input signal V3, and a fourth input signal V4, then outputting a product signal, which is the result of a multiplying operation of the voltage differences V1–V2 and V3–V4. However, in present practice, using a four-quadrant multiplier with low-voltage operation still presents some problems.

SUMMARY OF THE INVENTION

Based on such circumstances, the first object of the present invention is to provide a novel CMOS low-voltage four-quadrant multiplier, which is suitable for applications in low voltage operation and meets the future requirements of VLSI chips.

The second object of the present invention is to provide a novel CMOS low-voltage four-quadrant multiplier, which employs a relatively low number of transistors and a relatively simple configuration to perform the multiplication operation.

In view of the above-mentioned objects, the present invention provides a low-voltage four-quadrant multiplier comprising a high voltage source; a low voltage source; a first MOS transistor operated in the linear region, wherein a gate receives the third input signal, and a bulk is coupled to the low voltage source; a second MOS transistor operated in the linear region and having the same transconductance value as that of the first MOS transistor, wherein a gate receives the fourth input signal, and a bulk is coupled to the low voltage source; a first buffer means coupled across a negative terminal of the four-quadrant multiplier and a drain of the first MOS transistor, receiving the first input signal and maintaining a definite voltage difference between the first input signal and the drain of the first MOS transistor as well as a definite current difference between the negative terminal of the four-quadrant multiplier and the drain of the first MOS transistor; a second buffer means coupled across the high voltage source and a connected terminal of the sources of the first MOS transistor and the second MOS transistor, receiving the second input signal and maintaining the definite voltage difference between the second input signal and the connected terminal of the sources of the first MOS transistor and the second MOS transistor; a third buffer means coupled across a positive terminal of the four-quadrant multiplier and a drain of the second MOS transistor, receiving the first input signal and maintaining the definite voltage difference between the first input signal and the drain of the second MOS transistor as well as a definite current difference between the positive terminal of the four-quadrant multiplier and the drain of the second MOS transistor; a first load means at the negative terminal of the four-quadrant multiplier, coupled between the negative terminal of the four-quadrant multiplier and the high voltage source; a second load means having a same load value as the first load means at the positive terminal of the four-quadrant multiplier, coupled between the positive terminal of the four-quadrant multiplier and the low voltage source; whereby the voltage difference between the positive and negative output terminals of the low-voltage four-quadrant multiplier is proportional to the current difference between the first load means and the second means, furthermore, to the product of the voltage difference between the first input signal and the second input signal as well as the voltage difference between the third input signal and the fourth input signal.

BRIEF DESCRIPTION OF THE DRAWINGS

The detailed description of an embodiment of the present invention is made with reference to the accompanying drawings wherein.

DETAILED DESCRIPTION OF PREFERRED EMBODIMENTS

Buffer 10

Figure 1:
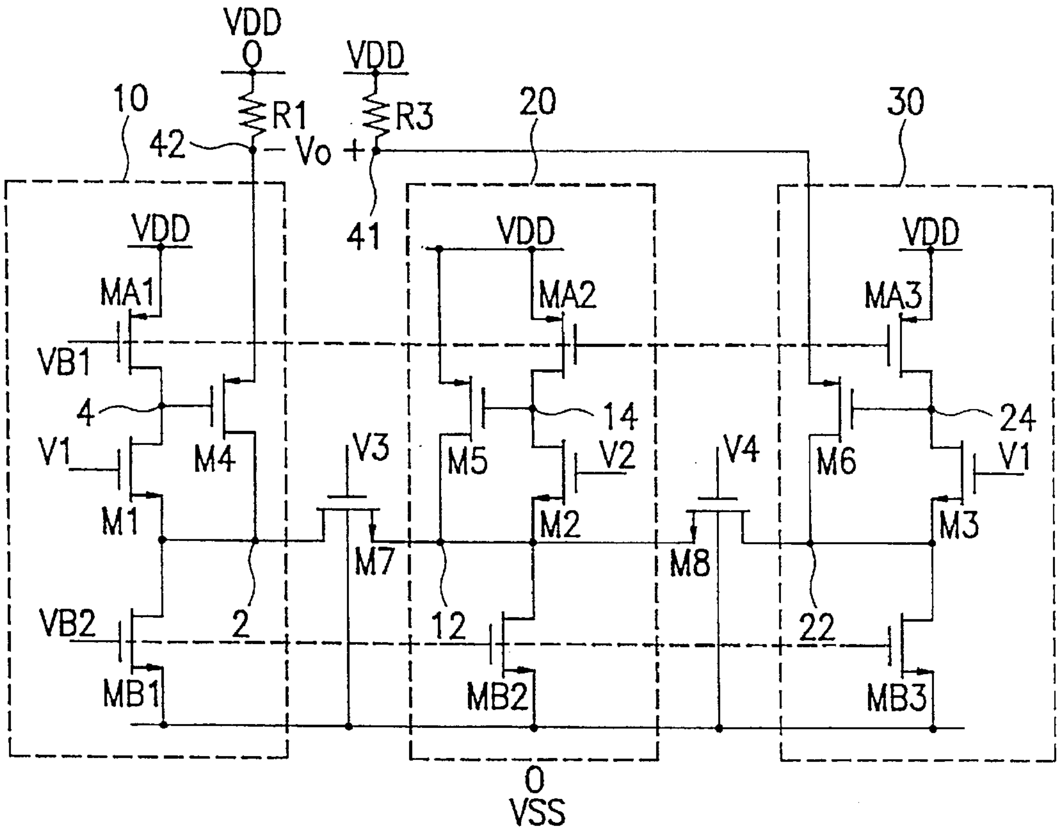
FIG. 1 is a circuit diagram of a CMOS low-voltage four-quadrant multiplier according to the present invention.

Refer to FIG. 1, which is a circuit diagram of a CMOS low-voltage four-quadrant multiplier according to the present invention. A buffer 10 comprises PMOS transistors MA1 and M4 as well as NMOS transistors MB1 and M1. The source-drain passage of the transistor M1 is coupled between the drains of both of transistors MA1 and MB1. The sources of transistors MA1 and MB1 are coupled to the high voltage source VDD and the low voltage source VSS, respectively. On the other hand, the transistors MA1 and MB1 serve as current sources by means of control signals VB1 and VB2, and the current flowing through the transistor MB1 is larger than that in the transistor MA1. The gate of the transistor M4 and the drain of the transistor M1 are connected at node 4. The drain of the transistor M4 and the source of the transistor M1 are connected at node 2. The source of the transistor M4 and a resistor R1 are connected at node 42. The first input signal V1 is coupled to the gate of the transistor M1.

Buffer 20

A buffer 20 comprises PMOS transistors MA2 and M5 as well as NMOS transistors MB2 and M2. The source-drain passage of the transistor M2 is coupled between the drains of both of transistors MA2 and MB2. The sources of transistors MA2 and MB2 are coupled to the high voltage source VDD and the low voltage source VSS, respectively. On the other hand, the transistors MA2 and MB2 serve as current sources by means of control signals VB1 and VB2, and the current flowing through the transistor MB2 is larger than that in the transistor MA2. The gate of the transistor M5 and the drain of the transistor M2 are connected at node 14. The drain of the transistor M5 and a source of the transistor M2 are connected at node 12. The source of the transistor M5 is coupled to the high voltage source VDD. The second input signal V2 is coupled to the gate of the transistor M2.

Buffer 30

A buffer 30 comprises PMOS transistors MA3 and M6 as well as NMOS transistors MB3 and M3. The source-drain passage of the transistor M3 is coupled between the drains of both of transistors MA3 and MB3. The sources of transistors MA3 and MB3 are coupled to the high voltage source VDD and the low voltage source VSS, respectively. On the other hand, the transistors MA3 and MB3 serve as current sources by means of control signals VB1 and VB2, and the current flowing through the transistor MB3 is larger than that in the transistor MA3. The gate of the transistor M6 and the drain of the transistor M3 are connected at node 24. The drain of the transistor M6 and the source of the transistor M3 are connected at node 22. The source of the transistor M6 and a resistor R3 are connected at node 41. The first input signal V1 is coupled to the gate of the transistor M3.

Transistors M7 and M8

All MOS transistors are operated in the saturation region except the transistors M7 and M8, which are operated in the linear region. The transistors M7 and M8 can be NMOS or PMOS ones in the present invention, however, for this embodiment, we choose NMOS transistors to explain the principle of operation. The drain-source passage of the transistor M7 is coupled between node 2 and node 12, and the third input signal V3 is fed into the gate of the transistor M7. On the other hand, the drain-source passage of the transistor M8 is coupled between node 22 and node 12, and the fourth input signal V4 is fed into the gate of the transistor MS. The nodes 41 and 42 constitute terminals for providing the output signal $V_O$.

The operation of the four-quadrant multiplier shown in FIG. 1 can be described as follows:

The drain current $I_D$ of a MOS transistor operated in the linear or saturation region can be expressed as $$I_D=\frac{1}{2}K[2(V_{GS}-V_T)V_{DS}-V_{DS}^2] \quad (1)$$

-continued $$I_D=\frac{1}{2}K(V_{GS}-V_T)^2 \quad (2)$$

wherein K represents the transconductance parameter of the MOS transistor. The transistors MA1, MA2, and MA3 serving as current sources are controlled by the first control signal VB1, and the current values through these transistors are all set to IA. Therefore, the drain currents of the transistors M1, M2, M3 also should be IA. Based on Equation (2) and the above relationship, the voltages at the nodes 2, 12, and 22 can be expressed as $$V1-V_D=\sqrt{\frac{2\times IA}{K}}+V_T \quad (3)$$

$$V2-V_S=\sqrt{\frac{2\times IA}{K}}+V_T \quad (4)$$

wherein $V_D$ represents the voltages of the node 2 and 22, and $V_S$ represents the voltage of the node 12. It maintains a definite or predetermined voltage difference between the node 2 and the first input signal V1, the node 12 and the second input signal V2, the node 22 and the first input signal V1. Suppose that the transistors M7 and M8 have the same transconductance parameter $K_7$, using Equation (1), the drain current difference between the transistors M7 and M8 can be expressed as $$I_{d7}-I_{d8}=K_7(V3-V4)(V1-V2) \quad (5)$$

wherein $I_{d7}$ represents the drain current of the MOS transistor M7 and $I_{d8}$ the drain current of the MOS transistor MS. As described above, the currents (set to IB) flowing through MOS transistors MB1, MB2, and MB3 must be larger than IA. Therefore, it maintains a definite or predetermined current difference between the drain current flowing through the transistor M7 and that in the node 42, and the drain current flowing through the transistor M8 and that in the node 41. Then the voltage between the node 41 and 42 can be expressed as $$\begin{aligned} V_0 &= (I_{d7}-I_{d8})R_L \\ &= R_LK_7(V3-V4)(V1-V2) \end{aligned} \quad (6)$$

Figure 2:
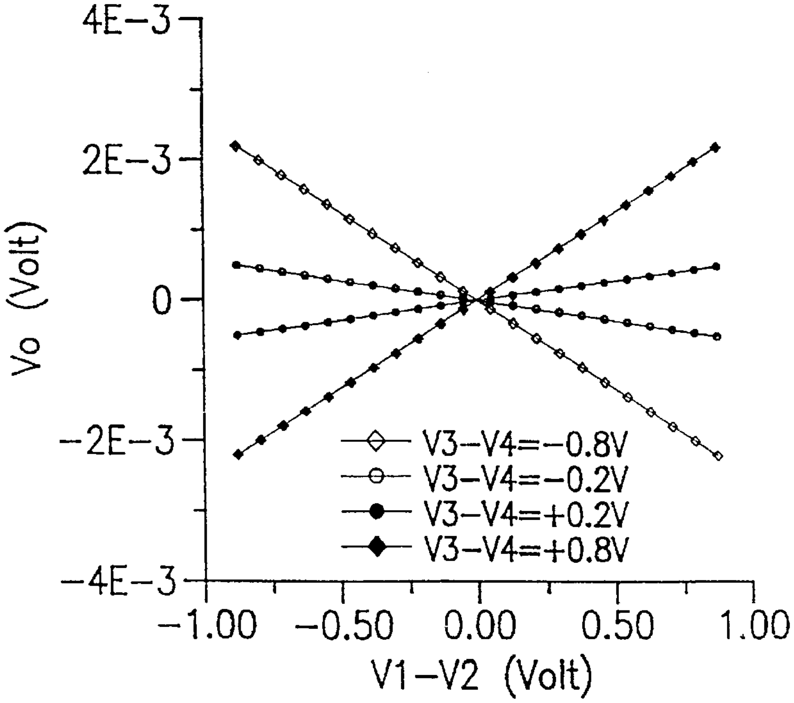
FIG. 2 is a graph showing characteristics of the output voltage $V_O$ of the four-quadrant multiplier under various input conditions.

Refer to FIG. 2, which is a graph showing the characteristics of the output voltage $V_O$ in the four-quadrant multiplier shown in FIG. 1. It reveals the relationship of the output voltage $V_O$ verses the signal (V1–V2), under the conditions of the signals V3–V4=±0.2 V, ±0.8 V, and the high/low voltage sources ±1.5 V. The linear operation can reach ±0.8 V, and the bandwidth is about 12 MHz. The solid lines shown in FIG. 2 are the theoretical results under the various conditions.

The foregoing description of preferred embodiments of the present invention has been provided for the purposes of illustration and description. It is not intended to be exhaustive or to limit the invention to the precise forms disclosed. Many modifications and variations will be apparent to practitioners skilled in this art. The embodiments were chosen and described to best explain the principles of the invention and its practical application, thereby enabling others skilled in the act to understand the invention for various embodiments and with various modifications as are suited to the particular use contemplated. It is intended that the scope of the invention be defined by the following claims and their equivalents.

What is claimed is:

1. A low-voltage four-quadrant multiplier for calculating the product of the voltage difference between a first input signal and a second input signal and the voltage difference between a third input signal and a fourth input signal, which comprises:

a positive output terminal;

a negative output terminal;

a high voltage source;

a low voltage source;

a first MOS transistor operated in the linear region, wherein a gate of said first MOS transistor receives said third input signal, and a bulk of said first MOS transistor is coupled to said low voltage source;

a second MOS transistor operated in the linear region and having the same transconductance value as that of said first MOS transistor, wherein a gate of said second MOS transistor receives said fourth input signal, a bulk of said second MOS transistor is coupled to said low voltage source, and a source of said second MOS transistor is connected to a source of said first MOS transistor at a node;

a first buffer means, coupled to the negative output terminal and to a drain of said first MOS transistor, for receiving said first input signal and for maintaining a voltage difference between said first input signal and the drain of said first MOS transistor at a predetermined voltage difference value as well as maintaining a predetermined current difference between the negative output terminal and the drain of said first MOS transistor;

a second buffer means, coupled to said high voltage source and said node, for receiving said second input signal and for maintaining a voltage difference between said second input signal and said node at said predetermined voltage difference value;

a third buffer means, coupled to the positive output terminal and to a drain of said second MOS transistor, for receiving said first input signal and maintaining said a voltage difference between said first input signal and the drain of said second MOS transistor at said predetermined voltage difference value as well as maintaining a predetermined current difference between the positive output terminal and the drain of said second MOS transistor;

a first load coupled between the negative output terminal and said high voltage source; and a second load coupled between the positive output terminal and said low voltage source, the first and second loads having load values which are the same;

whereby a voltage difference between the positive and negative output terminals is proportional to a difference in current through said first load and said second load, and to the product of the voltage difference between said first input signal and said second input signal and the voltage difference between said third input signal and said fourth input signal.

2. The multiplier of claim 1, wherein said first buffer means comprises:

a first current source, an inlet terminal of said first current source being coupled to said high voltage source, the first current source having a current value;

a second current source, an outlet terminal of said second current source being coupled to said low voltage source, the second current source having a current value, the current value of said second current source being larger than that of said first current source;

a first NMOS transistor, a source-drain passage of said first NMOS transistor being coupled between an outlet terminal of said first current source and an inlet terminal of said second current source, and a gate of said first NMOS transistor being coupled to said first input signal; and a first PMOS transistor, a source-drain passage of said first PMOS transistor being coupled between the negative output terminal and the drain of said first MOS transistor, the drain of said first PMOS transistor being also coupled to the source of said first NMOS transistor, and a gate of said first PMOS transistor being coupled to the drain of said first NMOS transistor.

3. The multiplier of claim 1, wherein said second buffer means comprises:

a third current source, an inlet terminal of said third current source being coupled to said high voltage source, the third current source having a current value;

a fourth current source, an outlet terminal of said fourth current source being coupled to said low voltage source, the fourth current source having a current value, the current value of said fourth current source being larger than that of said third current source;

a second NMOS transistor, a source-drain passage of said second NMOS transistor being coupled between an outlet terminal of said third current source and an inlet terminal of said fourth current source, and a gate of said second NMOS transistor being coupled to said second input signal; and a second PMOS transistor, a source-drain passage of said second PMOS transistor being coupled between said high voltage source and said node, the drain of said second PMOS transistor being also coupled to the source of said second NMOS transistor, and a gate of said second PMOS transistor being coupled to the drain of said second NMOS transistor.

4. The multiplier of claim 1, wherein said third buffer means comprises:

a fifth current source, an inlet terminal of said fifth current source being coupled to said high voltage source, the fifth current source having a current value;

a sixth current source, an outlet terminal of said sixth current source being coupled to said low voltage source, the sixth current source having a current value, the current value of said sixth current source being larger than that of said fifth current source;

a third NMOS transistor, a source-drain passage of said third NMOS transistor being coupled between an outlet terminal of said fifth current source and an inlet terminal of said sixth current source, and a gate of said third NMOS transistor being coupled to said first input signal; and a third PMOS transistor, a source-drain passage of said third PMOS transistor being coupled between the negative output terminal and the drain of said first MOS transistor, the drain of said third PMOS transistor being also coupled to the source of said third NMOS transistor, and a gate of said third PMOS transistor being coupled to the drain of said third NMOS transistor.

5. The multiplier of claim 1, wherein said first MOS transistor is an NMOS transistor.

6. The multiplier of claim 1, wherein said first MOS transistor is a PMOS transistor.

7. The multiplier of claim 1, wherein said second MOS transistor is an NMOS transistor.

8. The multiplier of claim 1, wherein said second MOS transistor is a PMOS transistor.

9. A four-quadrant multiplier, for use with a power supply having first and second power supply terminals, to multiply a voltage difference between first and second input signals by a voltage difference between third and fourth input signals, comprising:

first, second, and third current sources connected to the first power supply terminal;

fourth, fifth and sixth current sources connected to the second power supply terminal;

first and second output terminals;

a first load connecting the first output terminal to the first power supply terminal;

a second load connecting the second output terminal to the second power supply terminal;

a first MOS transistor which is connected to the first current source at a first node and which is connected to the fourth current source at a second node, the first MOS transistor having a gate which receives the first input signal;

a second MOS transistor which is connected to the second current source at a third node and which is connected to the fifth current source at a fourth node, the second MOS transistor having a gate which receives the second input signal;

a third MOS transistor which is connected to the third current source at a fifth node and which is connected to the sixth current source at a sixth node, the third MOS transistor having a gate which receives the first input signal;

a fourth MOS transistor which is connected between the first load and the second node, the fourth MOS transistor having a gate which is connected to the first node;

a fifth MOS transistor which is connected between the first power supply terminal and the fourth node, the fifth MOS transistor having a gate which is connected to the third node;

a sixth MOS transistor which is connected between the second load and the sixth node, the sixth MOS transistor having a gate which is connected to the fifth node;

a seventh MOS transistor which is connected between the second and fourth nodes, the seventh MOS transistor having a gate which receives the third input signal; and an eighth MOS transistor which is connected between the fourth node and the sixth node, the eighth MOS transistor having a gate which receives the fourth input signal.

10. The multiplier of claim 9, wherein the first, second, and third current sources have current values which are the same.

11. The multiplier of claim 10, wherein the fourth, fifth, and sixth current sources have current values which are the same.

12. The multiplier of claim 10, wherein the fourth, fifth, and sixth current sources have current values which are the same, and which are greater in magnitude that the current values of the first, second, and third current sources.

13. The multiplier of claim 9, wherein the seventh and eighth MOS transistors operate in the linear region.

* * * * *